United States Patent
Moon

[11] 3,879,765
[45] Apr. 29, 1975

[54] WATER SAVING METHOD FOR WATER CLOSETS
[75] Inventor: Jacob R. Moon, Hillsborough, N.C.
[73] Assignee: Moon Water Saver, Inc., Hillsborough, N.C.
[22] Filed: Feb. 27, 1973
[21] Appl. No.: 336,163

Related U.S. Application Data
[62] Division of Ser. No. 105,032, Jan. 8, 1971.

[52] U.S. Cl. ................... 4/1; 4/34; 4/67 A
[51] Int. Cl. ............................ A47k 17/00
[58] Field of Search ........... 4/18, 1, 34, 67 R, 67 A, 4/18.5, 57 R, 57 P, 41, 42, 28, 20, 29

[56] References Cited
UNITED STATES PATENTS
1,323,703  12/1919  Linfoot ..................... 4/18
3,041,630  7/1962  Williams ................... 4/57 R
3,151,337  10/1964  Deniz ....................... 4/67 A
3,259,918  7/1966  Walker, Sr. et al. ....... 4/18

Primary Examiner—Henry K. Artis

[57] ABSTRACT

The amount of water used for bowl evacuation of a water closet is substantially reduced by a method dependent on modifying the water tank construction above and around the valve seat either in its original design or by employment of an internal auxiliary deformable structure which is bent into a configuration whereby the water employed for evacuation and bowl washing is caused to collect as a rather shallow depth rectangular body of water rather than as the usual relatively deep rectangular body of water inherent to the conventional deep, rectangular water tank but without substantially affecting the normal velocity or quality of flow.

6 Claims, 12 Drawing Figures

PATENTED APR 29 1975 3,879,765

WATER SAVING METHOD FOR WATER CLOSETS

CROSS REFERENCE TO RELATED APPLICATION

This application is a division of my copending application Ser. No. 105,032, filed Jan. 8, 1971, under the title "Water Saving Apparatus and Method for Water Closets."

BACKGROUND OF THE INVENTION

1. Field of the Invention

The invention relates to water closets of the type normally supplied by relatively deep rectangular water storage tanks. More particularly, the invention relates to a method of water saving for water closets and to adapting the water tanks of said closets so that less than the normal amount of water is used to achieve adequate flushing but without any substantial sacrifice in velocity or quality of water flow.

2. Description of the Prior Art

A common type of water closet in widespread household, hotel motel and institutional use employs a relatively deep, rectangular tank in which the valve mechanism is mounted. Water closets have heretofore been adapted to save water in effecting bowl evacuation by various modifications of the water tank. Prevalent modifications comprise multiple water compartments in series as in U.S. Pat. No. 2,715,228, or in alternative arrangements as in U.S. Pat. No. 3,344,439. Additionally, the mechanical flush controls have been modified to provide choices of flush such as full and water-saving. A recent example of the latter is found in U.S. Pat. No. 3,538,519. While achieving the objective of saving water in accomplishing an adequate flush the prior art requires modifications beyond the capability of the ordinary home owner, such as tank fabrication or quite precise mechanical arrangements to achieve mechanically actuated and controlled flushes utilizing less than all of the water in the water tank. As a result, the prior art is practically and economically restricted to practice by water closet and plumbing manufacturers.

The majority of water closets found in homes and in many hotels, motels, institutions, etc., whether old or new are of the standard deep rectangular tank model variety of any given manufacturer due to their lower costs. Home owners desiring to effect water savings in accordance with the objects of this invention must therefor incur the expense of purchasing and having installed new plumbing or new water closets manufactured in accordance with the prior art. However, the prior art does not provide an inexpensive, easily and quickly installed water saving device for previously installed water closets which maintains the quality of water flow during flush and thereby maintain the quality of bowl side washing per unit of water utilized.

SUMMARY OF THE INVENTION

The subject invention effectively employs the principles of hydrostatics and fluid dynamics to save water when the invention is utilized in any given water closet tank. The apparatus is passive in that no work is done by it on the water in the tank and therefore no external energy is required and the kinetic energy per unit of flushed water remains very nearly what it would normally be for any given water closet. Rather, the apparatus functionally, according to the method employed, divides the water volume in the tank into two parts: one of which is employed in flushing and the other of which is essentially residual and continuously subjected to the damming influence of the apparatus.

In the preferred embodiment of the invention, the apparatus is a rectangular sheet of moderately flexible material adapted to being folded into a four-walled open-ended, rectangular box. Suitable means, such as rubber bands, are employed to maintain the four-walled configuration. As configured, the apparatus, according to the method of the invention, is retained on the bottom of the water tank so as to surround the seated flush valve by suitable means such as a brace attached to the water overflow pipe at one end and the apparatus at the other end. When the flush is initiated the water within the apparatus and that within the water tank above the height of the apparatus flows through the tank drain and is utilized for flushing. The flush valve seats when the water surface within the apparatus is at the height at which the valve would normally seat without the apparatus. However, at the moment of flush valve seating, a volume of water is retained within the water tank and outside the apparatus with its surface essentially at the height of the apparatus. This retained volume of water, less that normally remaining at flush valve seating when the apparatus is not employed, represents the amount of water saved. The normal velocity, quality of water flow into the bowl, bowl side washing and bowl evacuation are maintained and undiminished. The quantity of water used only is affected and substantially diminished.

Therefore, an object of this invention is to provide a water-saving device and method easily and quickly applied by the home-owner to previously installed water closets which also insures maintaining the normal velocity, quality of water flow into the bowl, bowl side washing and bowl evacuation.

More objects will become apparent as the detailed description proceeds.

DESCRIPTION OF THE PREFERRED EMBODIMENTS

Figure 1:
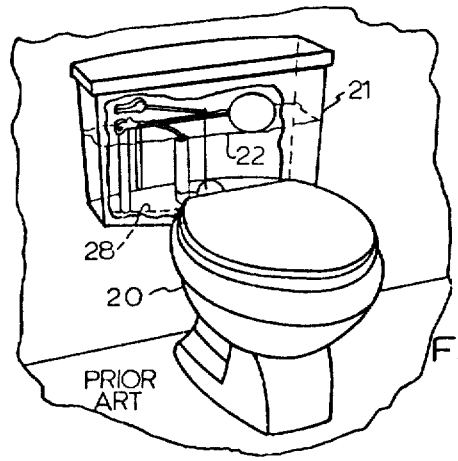
FIG. 1 is a perspective view of a conventional water closet with a portion of its water tank cut away to reveal internal plumbing, its full flush water line and its valve seating water line.
Figure 4:
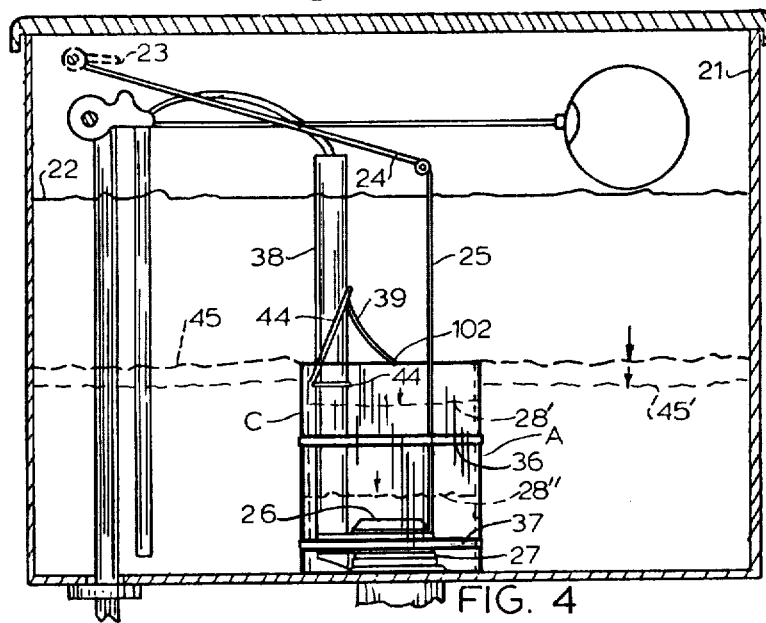
FIG. 4 is a front elevation view of a water closet tank with portions thereof cut away to show the apparatus of FIG. 2 folded as an open ended box and in position for use with a pivotal tank valve.

FIG. 1 shows a typical conventional water closet having a deep rectangular shape and consisting of bowl 20 and water tank 21. As best shown in FIG. 4, water tank 21 contains a volume of water the surface of which, when the tank is full, is typically from eight to ten inches above the tank bottom as represented by full flush water level 22. The water surface reaches level 28, the normal valve seating water level, during a normal flush at which time the valve 26 becomes seated. As is well known in the art, the flush itself is initiated by depressing handle 23 which pivots upwardly rod 24 to which is attached a chain 25. Chain 25 is also attached to valve 26 and causes its unseating whenever handle 23 is sufficiently depressed. As is also well known in the art the draining water interfacing valve 26 and tank exit pipe 27 retains valve 26 in an unseated position until the water level reaches level 28. The water exiting tank 21 through pipe 27 enters bowl 20 and forms a head of water therein sufficient to cause bowl evacuation by siphonic action.

It is to be specially noted that this invention recognizes that not all of the water normally exiting tank 21 is actually needed in bowl 20 to accomplish siphonic bowl evacuation in standard water closet tanks having a full flush water level of from eight to ten inches. That is, siphonic bowl evacuation has been observed to begin before valve seating. The invention also recognizes that if the valve is caused to be seated nearer the time bowl evacuation is initiated, less water will be utilized than will be the case when water is allowed to be substantially depleted from tank 21 after a sufficient head is created in bowl 20 to cause the siphonic evacuation. The term "head," as used herein, simply refers to a height or vertical column of water as is commonly employed in hydrostatic terminology. The head of water in the water closet tank is directly related to the velocity of draining water through pipe 27 since the water closet is an "open" system; that is, exposed to atmospheric pressure on both sides of the body of water. Therefore, to simply adjust the water closet mechanics to achieve a lower full-flush water line below level 22 would not meet the objectives of this invention in that a lesser head of water would produce a smaller exiting velocity through pipe 27 and less turbulent water flow, therefor, for any given water closet configuration. This would diminish the quality of bowl side washing per unit of water utilized because the more turbulent the flow the more sporatic the path of travel for water molecules and the more vigorous the washing effect. Stated another way, the more laminar the flow of water the more smoothly the molecules flow in a linear direction parallel to the conduit surfaces. The method and apparatus of this invention employs the normal, full-flush head of water for any given water closet of the conventional deep, rectangular tank type thereby maintaining the aforementioned qualities of flush while saving a substantial portion of the water in tank 21 normally used in the flush.

Figure 2:
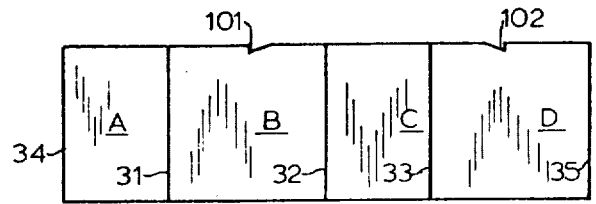
FIG. 2 is a front elevation view of the unfolded four-walled water saving apparatus constituting the first embodiment.
Figure 3:
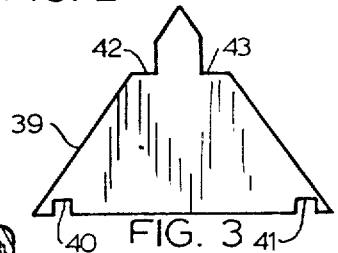
FIG. 3 is a front elevation view of the triangular brace used to press the water saving apparatus against the water closet tank bottom.
Figure 5:
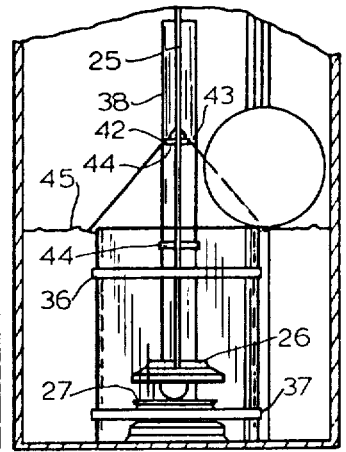
FIG. 5 is a fragmentary sectional side view of a water closet tank showing the invention apparatus in position with a pivotal tank valve.
Figure 6:
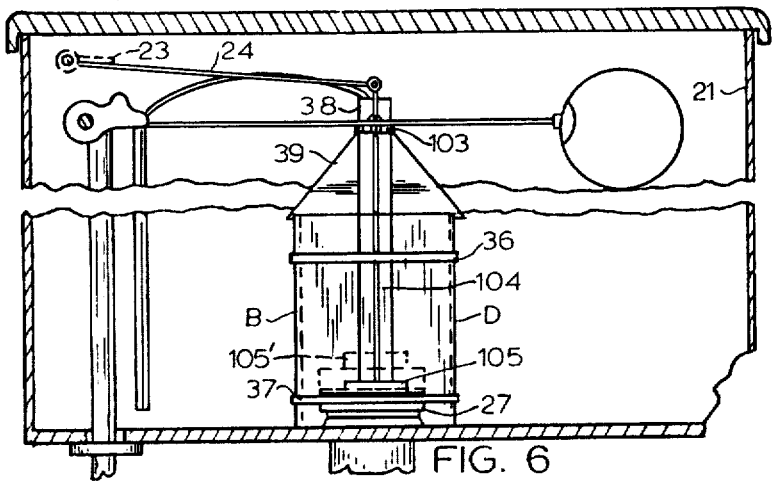
FIG. 6 is a fragmentary sectional front view of a water closet tank showing the invention apparatus in position with a drop tank valve.
Figure 12:
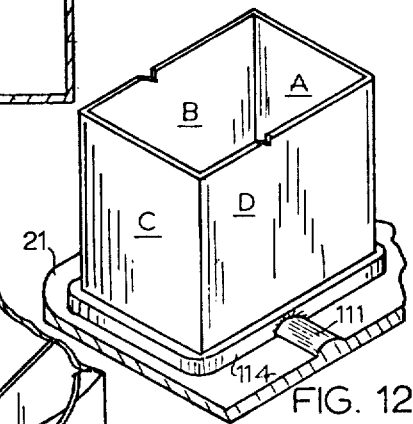
FIG. 12 is a fragmentary sectional view of a water-closet tank bottom showing a second adaptation of the device of FIG. 2 when tank bottom ridges are encountered.
Figure 11:
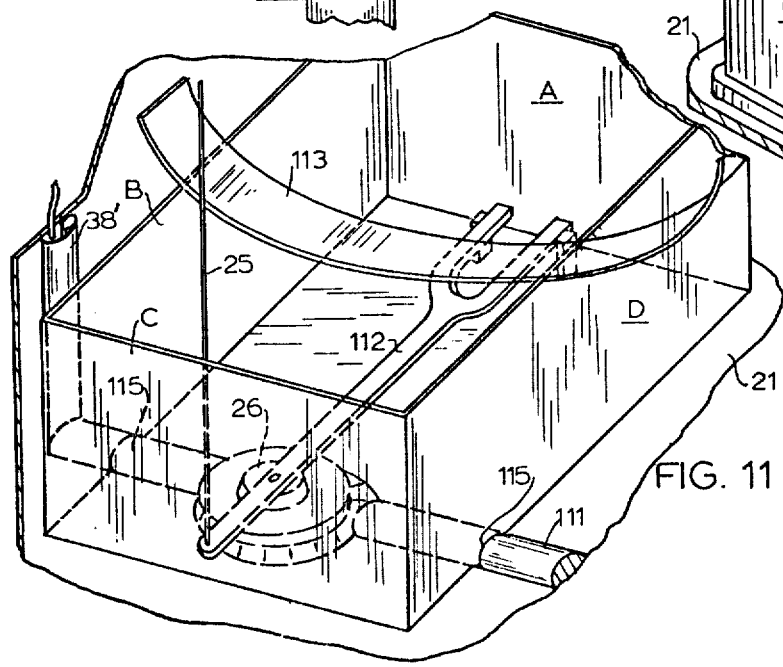
FIG. 11 is a fragmentary sectional view of a water-closet tank bottom showing adaptation of the four-walled water saving device of FIG. 2 to tanks of the type having bottom ridges, a rigid pivotal valve rod and an overflow conduit attached to a wall.

The preferred and first embodiment of the invention apparatus consists of a four-walled rectangular structure formed from a moderately flexible, scored and notched rectangular sheet of plastic as shown in FIG. 2 and a retaining member as shown in FIG. 3. The sheet of plastic, one-eighth inch thick, is scored along lines 31, 32, 33, 34 and 35 dividing the sheet into the four walls A, B, C and D. Walls B and D are notched at 101 and 102, respectively. The scorings are such that when walls A and B are folded toward one another along line 31 they meet at essentially a 90° angle. Similarly walls B and C fold along line 32, C and D fold along line 33 and D and A fold so that lines 34 and 35 are mated. With the walls so folded the notches 101 and 102 are mirror images and the sheet achieves a four-walled rectangular open ended, box configuration as shown in FIG. 12, having an approximate length of 6 inches, a width of 4 inches and a height of 6 inches. The configuration is maintained by use of two rubber bands 36 and 37, respectively positioned as shown in FIGS. 4 and 5. A rectangularly formed integral tubing of moderately flexible plastic, cut at six inch intervals and possessing the required dimensions provides a suitable substitute when notches 101 and 102 are provided. The configured device is then placed on the tank bottom about both overflow pipe 38 and valve 26 with wall C adjacent pipe 38 so that notches 101 and 102 are in proper position to receive brace member 39. Brace 39, FIG. 3, is an equilateral triangle of approximately 4 1/2 inch sides, provided with square notches 40 and 41 along one edge and at the apex opposite thereto with notches 42 and 43. In operation notches 40 and 41 of brace 39 are engaged with notches 102 and 101, respectively, of the water-saver as shown in FIG. 4. Rubber band 44 is wound around overflow pipe 38 and looped over brace 39 at notches 42 and 43. A suitable substitute for rubber band 44 is adjustable metal band 103 as shown in FIG. 6. In this manner the water-saver is retained and pressed against the tank bottom by the resilient brace 39.

As thus retained, the water-saver effectively divides the volume of water under surface level 22 into two volumetric portions. One portion is in communication with drain pipe 27 when valve 26 is unseated and consists of the water above dotted line 45 of FIGS. 4 and 5 and includes the water within the water-saver thus insuring utilization of the normal full-flush level water head and maintenance of normal flush water flow qualities. The other portion consists of the water confined between the water-saver walls and the tank walls. During flushing, water surface 22 separates into the two surfaces 45 and 28'. Surface 28' continues to descend and in a more rapid manner than surface 22 until it reaches level 28" whereupon valve 26 is seated upon pipe 27. Surface 45 continues to descend but at a rate slower than that of 28' and reaches its lowest level 45' when surface 28' reaches its valve 26 seating level, level 28''. Ideally, with a water tight seal between the water-saver edges in contact with the tank bottom and the tank bottom, surface level 45 would not descend any further. However, the fact that it does descend to surface level 45' is believed to be attributable to the differential pressure developed by the differential head of surface 45 and surface 28' caused by their different rates of descent which in turn causes some slight water flow under the water-saver edges in contact with the tank bottom and into pipe 27. Thus, in the preferred embodiment without the water tight seal, the water saved in tank 21 when practicing the invention is represented by the volume of water contained between the water-saver and tank walls along the vertical dimension between level 28 and level 45'. Considering the magnitude of the water supply problem facing our large cities this is of course an extremely significant saving.

The water-saver works equally well with the older water closets having a drop valve 105, (FIG. 6) attached to one end of rod 104 which is attached at its other end to pivotal rod 24. Thus, when handle 23 is sufficiently depressed, drop valve 105 is unseated at alternate position 105' and water exits tank 21 through pipe 27 with the same water saving effects previously mentioned.

Figure 7:
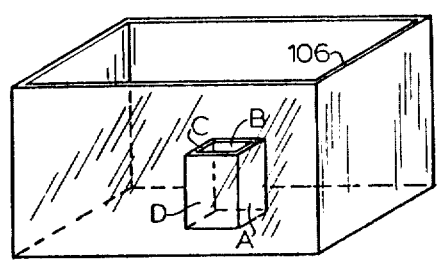
FIG. 7 is a perspective view showing the geometric relationship between the walls of the water-saving apparatus and the walls of a transparent tank model which simulates the conventional type tank to which the apparatus of FIG. 2 is adapted.
Figure 9:
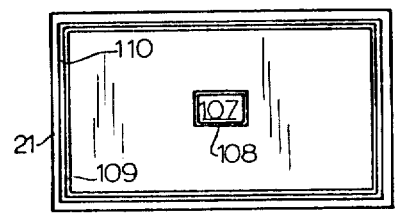
FIG. 9 is a plan view of the nine-walled water-saving device installed in a normal water closet tank but for the purpose of illustration with the lid and internal plumbing removed.
Figure 8:
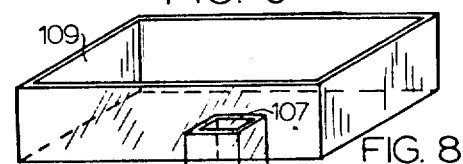
FIG. 8 is a perspective view of a molded nine-walled water saving device constituting a second embodiment and designed to be inserted in the conventional tank.
Figure 10:
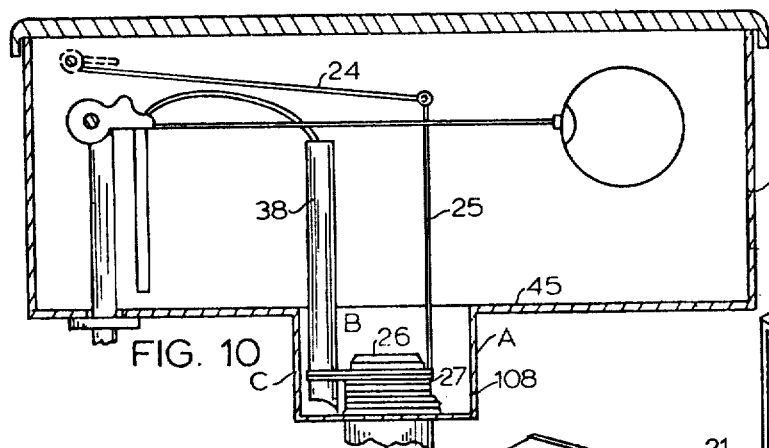
FIG. 10 is a sectional side elevation view illustrating a typical arrangement of internal plumbing for a FIG. 8 type structure.

In addition to the four-walled configuration for the water-saver, a nine-wall configuration can be constructed and provide the basis for a water saving configuration of the water tank itself. In FIG. 7 transparent model 106 of the four walls of water tank 21 illustrates the geometric relationship of the water-saver box of the invention to the tank 21. From FIG. 7 it can be seen that when a plane is passed parallel to the top edges of model 106 but touching the top edges of water-saver walls A, B, C and D a nine-walled configuration as shown in FIG. 8 is achieved. An opening 107 provides communication between the two rectangular portions 108 and 109 of FIG. 8. The nine-walled water-saver of FIG. 8, the second embodiment, can be molded of plastic or the like and utilized by being inserted as a unit in a water tank 21. FIG. 9 illustrates this employment wherein a foam rubber seal 110 is used for positional spacing. The FIG. 8 configuration can be used as the water tank itself to provide a relatively shallow rectangular tank in place of the usual relatively deep water tank 21. FIG. 10 illustrates the FIG. 8 embodiment in cross section but without the tank walls for purpose of simplification.

However, as is readily apparent, the most inexpensive and easily practiced embodiment is the four-walled open-ended box configuration of the water-saver shown in FIGS. 2, 4, 5, 6, 11 and 12. This configuration is easily adaptable to meet the normal variations in internal construction of water tanks. For example, the water tank 21 of FIG. 11 has ridges 111 on its bottom which would be detrimental to the practice of the invention with a water-saver having flat bottom edges of walls A, B, C and D since water could not be retained. This is remedied however by contouring the bottom edges where necessary with curvatures 115 such as by cutting the walls B and D. Alternatively the ridges 111 may be accommodated by a pliable interfacing member 114, such as moderately soft foam rubber, attached to the bottom edges of walls A, B, C and D as shown in FIG. 12 and conforming to the curvature of ridges 111 while minimizing water flow under the water-saver. It will also be noticed that in FIG. 11 valve 26 is attached to pivoting member 112 instead of to overflow pipe 38'. If necessary, walls C and D can be given larger dimensions to accommodate member 112. Also it is seen that overflow pipe 38' is attached or molded into the wall of tank 21 making it difficult to employ brace 39 for retaining the position of the water-saver on the tank bottom. This may be overcome by use of strap brace 113 made of a moderately flexible material such as plastic and possessing dimensions sufficient to retain a downward arcuate curvature when compressed between the the walls of tank 21 and made to contact the top edges of walls B and D. From the foregoing examples it can be seen that the invention readily adapts to the usual variations found in the basic rectangular and relatively deep tank to which the invention is directed.

The following example is cited to illustrate the invention. It is not intended to limit it in any way. Number, references are those found in FIGS. 1 and 4, unless otherwise noted.

EXAMPLE

The four-walled water-saver configuration, constituting the first embodiment, was employed in water tank 21 having a tank bottom of 19 inches by 7 inches, a full-flush water level 22 of 8 inches and a valve seating level 28 of 2 1/4 inches. The time between initiating flushing and valve seating took 11 seconds. Chain 25 was disconnected from rod 24 and rod 24 was lifted and pushed toward the rear wall of tank 21. The water-saver was formed under water from the FIG. 2 rectangular sheet of plastic and rubber bands 36 and 37 were placed thereabout to form the open-ended box of the invention. Rubber band 44 and brace 39 were then emplaced. Chain 25 was reconnected. Total installation time was under 5 minutes. After the water-saver was installed, multiple flushes were effected and the following measurements were obtained: Surface level 45' was 5 and 9/16 inches, surface level 28 inches of FIG. 4 was identical to level 28 of FIG. 1: 2 1/4 inches, the time from flush initiation to valve 26 seating was 11 seconds. The internal diameter of pipe 27 at its entrance was 2 1/2 inches. Additional values of interest were the following:

|  | Without Water-Saver | With Water-Saver |
|---|---|---|
| Water in tank before flush | 0.617 ft$^3$ | 0.617 ft$^3$ |
| Water in tank at valve seating | 0.173 ft$^3$ | 0.410 ft$^3$ |
| Water used in flush | 0.444 ft$^3$ | 0.207 ft$^3$ |
| Average flow rate from tank | 2.43 ft$^3$/minute | 2.49 ft$^3$/minute |
| Average velocity within tank | 2.62 ft/minute | 2.32 ft/minute |
| Average velocity within water-saver | — | 14.9 ft/minute |
| Average velocity within pipe 27 entrance | 44.55 ft/minute | 45.75 ft/minute |

As seen from the above example, for any given water closet the average velocity within the pipe 27 entrance remains virtually unchanged and perhaps slightly enhanced. The Reynolds number in the pipe 27 entrance for the above example is around 14,500 being slightly less when the water-saver is not used and slightly more when the water-saver is used. The Reynolds number represents the ratio of momentum transfer by turbulence over momentum transfer by molecular transport and, being dimensionless, is a criterion of similarity between two geometrically similar flows. Its relevance to the invention is apparent in that water flow through pipe 27 and onto the bowl sides is geometrically identical whether the tank 21 is modified or not, and hence teaches that the quality of water flow and side bowl washing per unit volume of water is maintained by the invention and perhaps somewhat enhanced.

Many variations may be employed without deviating from the scope of the invention. For example, brace 39 which presses or stabilizes the water saving column structure may have the notches 40 and 41 omitted. Also, the water saving column may have mating channels substantially adjacent lines 34 and 35 of walls D and A of the preferred embodiment, shown in FIGS. 2 and 12, so as to interlock and constitute the retaining means for holding the column walls together or so as to be occupied by the channel fitting surfaces of a corner brace. For brace 113 which is used in the embodiment of FIG. 11 to stabilize the water saving column there may be substituted, for example, an adjustable threaded expansion rod with roughened rubber surfaces contacting opposite walls of tank 21 and the top edges of walls B and D of the device (FIG. 11) so as to stabilize the device on the tank bottom.

What is claimed is:

1. In a water closet of the type having a tank formed by bottom and side walls and providing a hydraulic head and storage chamber of predetermined height and capacity, having a tank mechanism including a movable flush valve mounted internally and in the bottom wall of the tank and seated in one end of a conduit outlet connecting the tank to a lower positioned bowl, a manual handle means connected internally of the tank to open the valve to empty the tank and an internal cooperative water supply means for refilling the tank upon the valve returning to a closed position, the opening of the valve normally causing initiation of flushing and bowl evacuation followed by substantial emptying of the tank and then closing of the valve, a method of establishing a water saving column comprising the steps:

a. without altering any of the internal tank mechanism and without disturbing the normal functioning of the handle and water supply means or reducing the hydraulic head above the valve, installing an auxiliary inperforate foldable thin wall rectangular sheet member vertically seated within the tank and by working the member around the outlet and flush valve and avoiding other internal tank mechanism to contact selected internal tank surfaces including the bottom wall surface, establishing in effect a tubular open top, column closed by the tank bottom surface and extending immediately around the outlet and flush valve and extending upwardly for only a portion of the height of the tank water chamber, said column having a predetermined volume and configuration; and b. fixedly positioning said wall member in a position establishing said column substantially water tight with selected wall member edges contacting said selected internal tank surfaces thereby being effective upon said valve being opened to prevent on all openings thereof, emptying of the water in said tank outside said column below a level substantially equal to the level of said column top end and to cause said valve to seat and said tank to start refilling substantially immediately after said evacuation.

2. The method of claim 1 wherein said member is flexible and said working of said member includes flexing said member to form said column.

3. The method of claim 1 including the steps of joining selected edges of said member to form said compartment.

4. The method of claim 1 including installing said wall member within the tank in a manner wherein the member is bent into position and seats on the tank bottom wall.

5. The method of claim 1 including fixedly positioning said wall member by means engaging the internal tank walls.

6. The method of claim 1 wherein said all member is flexible and during said installing is bent into a four sided open ended structure to form said column.

* * * * *